UNITED STATES PATENT OFFICE.

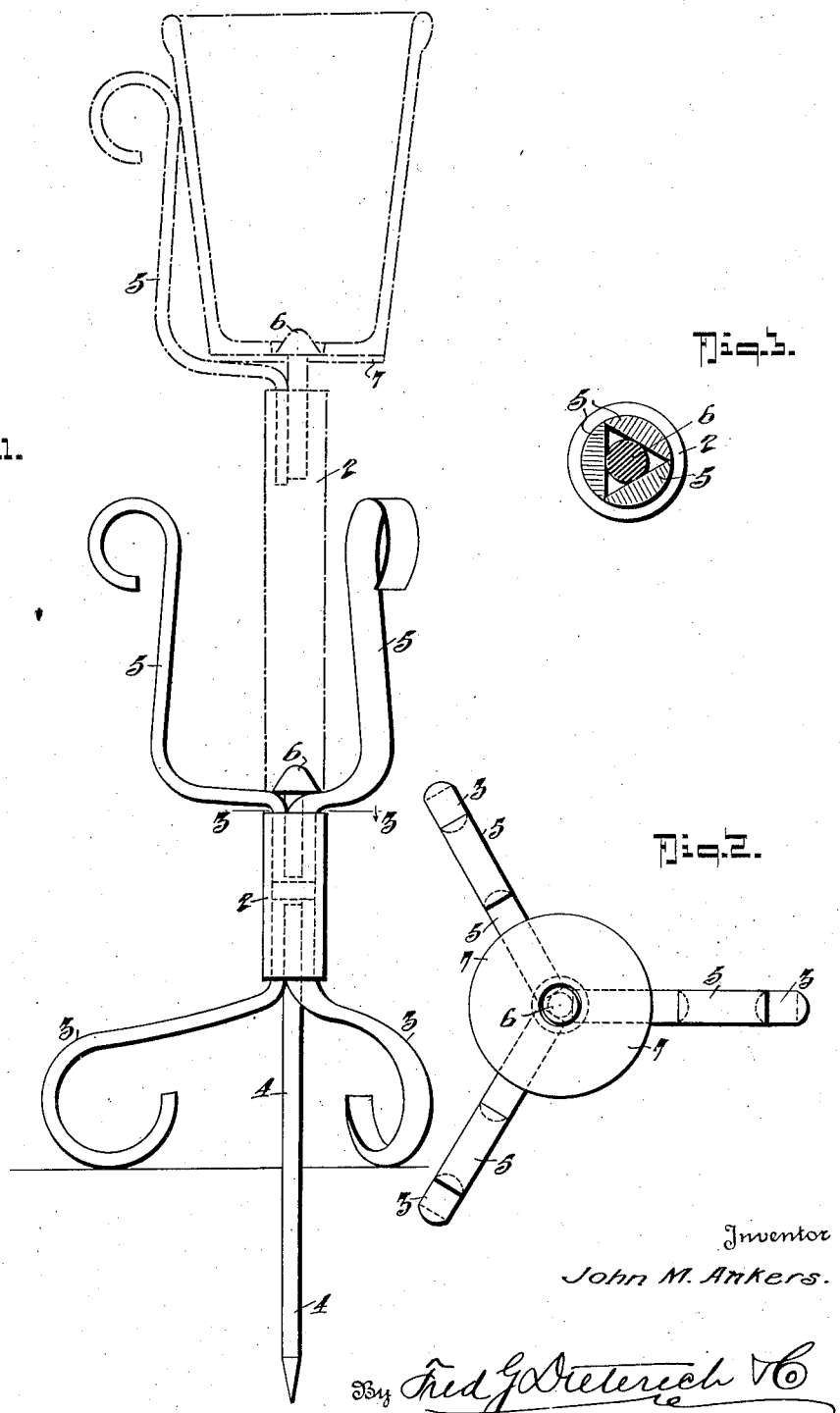

JOHN M. ANKERS, OF NEW WESTMINSTER, BRITISH COLUMBIA, CANADA.

FLOWER-SUPPORTING STAND.

1,369,315.   Specification of Letters Patent.   Patented Feb. 22, 1921.

Application filed March 25, 1920. Serial No. 368,613.

*To all whom it may concern:*

Be it known that I, JOHN M. ANKERS, a citizen of the Dominion of Canada, residing at New Westminster, in the Province of British Columbia, Canada, have invented certain new and useful Improvements in Flower-Supporting Stands, of which the following is a specification.

This invention relates to a stand adapted to receive and support a flower pot or flower containing vase above the level of the ground. It is designed for use on lawns or grass plats and particularly in a cemetery or graveyard where vases or pots of flowers are frequently displayed, and unless firmly supported are liable to be blown over with the wind.

The invention is particularly described in the following specification, reference being made to the drawings by which it is accompanied, in which:

Figure 1 is a side elevation, the dot and dash lines showing an upward extension and slight modification.

Fig. 2, a plan, and

Fig. 3, a section on the line 3—3 in Fig. 1.

In these drawings 2 represents a tubular central portion which may be of any desired length. Within the lower end of this tube 2 three base supports 3 are inserted. These are bent from what is known as half round or half oval iron, that is, one side of it is in cross section rounded and the opposite side is flat: The width of the iron in relation to the inside dimension of the tube is such that when three are inserted in the tube they will closely fit the same and leave a central core space.

From the portions inserted in the tube 2 the base supports 3 are bent downward and outward, somewhat as shown in Fig. 1, to form a tripod, and into the central core space a stem 4 is tightly driven to firmly secure them in position. This stem 4 projects well below the plane of the lower ends of the supports 3 and is designed to be pressed into the turf or the like and securely hold the stand in the upright position.

In the upper end of the tube 2, vase supporting members 5 similar in cross section to those 3 are inserted and are bent outward and upward to the general conformation of a vase or flower pot, such as they may be required to support. These are secured in position by a rivet 6 or the like driven into the central core space.

If considered desirable a circular plate 7 may be inserted under the head of the rivet and secured thereby.

A simple and compact stand is thus provided which will effectively serve the purpose for which it was designed. The central spike secures the stand against being blown over or upset and the tripod members 3 support it in the upright position.

The spike member 4 and rivet 6 being removed, the members 3 and 5 may be readily withdrawn from the tube 2 and the whole can be packed in a convenient manner for transportation.

I do not desire to be confined to the particular combination herein shown of the upper and lower supporting members 3 and 5, as one central tubular member 2 may be used to carry a number of branches, each having other central tubes 2 to receive supporting members for carrying a flower pot or flower vase, the essential feature of the invention residing in the means herein shown of securing the supporting members in a central tube by means of a pin or spike driven into the core space.

Having now particularly described my invention, I hereby declare that what I claim as new and desire to be protected in by Letters Patent, is:

1. An appliance for the purpose described comprising a tubular standard, supporting legs having upper extensions formed with inner flat surfaces and outer rounded surfaces whereby to seat within the lower end of the tubular standard and a spike that extends through the lower end of the standard and whose upper end constitutes a wedge key for locking the said upper ends of the supporting legs in close connection within the tubular standard.

2. A flower holding stand, comprising the combination with a central tubular member, support members bent from half oval iron outward and downward from ends inserted in the tubular member, a spike inserted in the central space between the inserted ends of the supports and projecting downward beyond the plane of the lower ends of said supports, and flower container supports bent from half oval iron from ends inserted in the tubular member and bent outward and upward to conform generally to the profile of the lower part of the flower container, and a pin inserted in the central space between the inserted ends of the container support to secure them in position.

3. A stand for a flower container, comprising members bent from half oval iron to approximately half the profile of the lower part of the container the lower ends of said members being turned down at right angles to the supporting members, a tubular member into which these downwardly turned ends are inserted, a centrally apertured circular plate and a rivet or the like through the central aperture of the plate and tightly fitting the central core space between the inserted ends of the support, and means for supporting the central tubular member.

In testimony whereof I affix my signature.

JOHN M. ANKERS.